United States Patent
Fuchs et al.

(10) Patent No.: US 7,457,310 B2
(45) Date of Patent: Nov. 25, 2008

(54) METHOD AND ARRANGEMENT FOR THE REMOTE-CONTROLLED TESTING OF A SPECIMEN

(75) Inventors: Andreas J. Fuchs, Vienna (AT);
Harald-J. Zainzinger, Vienna (AT);
Josef Zeilinger, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 489 days.

(21) Appl. No.: 10/519,367

(22) PCT Filed: Jun. 2, 2003

(86) PCT No.: PCT/EP03/05736

§ 371 (c)(1),
(2), (4) Date: Jul. 14, 2005

(87) PCT Pub. No.: WO04/002064

PCT Pub. Date: Dec. 31, 2003

(65) Prior Publication Data

US 2005/0249237 A1    Nov. 10, 2005

(30) Foreign Application Priority Data

Jun. 25, 2002  (EP) ................... 02014157

(51) Int. Cl.
*H04J 3/16*  (2006.01)

(52) U.S. Cl. ............ 370/466; 370/244; 370/251
(58) Field of Classification Search ........... 370/466, 370/467

See application file for complete search history.

(56) References Cited

U.S. PATENT DOCUMENTS

| | | | |
|---|---|---|---|
| 5,027,343 A | 6/1991 | Chan et al. | |
| 6,016,319 A * | 1/2000 | Kshirsagar et al. | 370/410 |
| 6,233,249 B1 * | 5/2001 | Katseff et al. | 370/466 |
| 6,320,875 B2 * | 11/2001 | Katseff et al. | 370/466 |
| 6,628,617 B1 * | 9/2003 | Karol et al. | 370/237 |
| 6,912,231 B2 * | 6/2005 | White et al. | 370/466 |
| 2002/0010866 A1 | 1/2002 | McCullough et al. | |

FOREIGN PATENT DOCUMENTS

WO     WO 01/55850 A1    8/2001

* cited by examiner

*Primary Examiner*—Ricky Ngo
*Assistant Examiner*—Dewanda Samuel

(57) ABSTRACT

Disclosed are a method and an arrangement for the remote-controlled testing of a specimen, the data of the control unit and the specimen being supplied in a format that corresponds to a transmission protocol used for the unsecured transmission of data. According to the inventive method, said data is converted into a format that corresponds to a transmission protocol used for the secured transmission of data, is transmitted, and is converted back in to a format corresponding to the transmission protocol used for the unsecured transmission of data before being received.

10 Claims, 1 Drawing Sheet

METHOD AND ARRANGEMENT FOR THE REMOTE-CONTROLLED TESTING OF A SPECIMEN

CROSS REFERENCE TO RELATED APPLICATIONS

This application is the US National Stage of International Application No. PCT/EP2003/005736, filed Jun. 2, 2003 and claims the benefit thereof. The International Application claims the benefits of European application No. 02014157.8 filed Jun. 25, 2002, both applications are incorporated by reference herein in their entirety.

FIELD OF THE INVENTION

The invention relates to a method for the remote-controlled testing of a specimen, with the data at the control unit and at the specimen being present in a format that corresponds to a transmission protocol used for the unsecured transmission of data. The invention furthermore relates to an arrangement for carrying out the method according to the invention.

BACKGROUND OF THE INVENTION

In contrast to previous practice, tests are nowadays frequently performed not on site, which is to say directly on a specimen, but from another location, which is to say under remote control. This involves the eventuality that data, in particular measurement results, may become corrupted on the transmission link between the control unit and specimen, especially when the data is transmitted in accordance with a transmission protocol used for the unsecured transmission of data. This means that a secured statement as to whether the measurement result reflects the actual situation on the specimen is not possible.

An example of a transmission protocol used for the unsecured transmission of data is the User Datagram Protocol, or UDP for short. UDP dispenses with error detection and correction, which is why processing of the data packets takes less time. A data packet also has a smaller header and hence a better useful data to packet length ratio.

UDP is thus better suited to applications that send short messages and repeat them in full when necessary, or to applications executed in realtime. The entire error-correction process therefore takes place within the application programs. This relates not only to bit errors but also to the total loss of the data packets, because routers will immediately reject UDP datagrams in the event of a high network load.

For the reasons cited, a complex method is required for securing the data within the control unit and specimen.

SUMMARY OF THE INVENTION

The object of the invention is therefore to disclose a method and an arrangement which will improve remote-controlled testing of a specimen.

Said object of the invention is achieved by means of a method
wherein the data which, when transmitted, is present in the format corresponding to the transmission protocol used for the unsecured transmission of data is converted to a format corresponding to a transmission protocol used for the secured transmission of data,
wherein the data is conveyed according to the transmission protocol used for the secured transmission of data, and
wherein the data is converted back, prior to reception, to a format corresponding to the transmission protocol used for the unsecured transmission of data.

This on the one hand ensures the secured transmission of data at least link by link, on the other hand there is no need for separate securing on the part of the control unit or specimen. The control unit and specimen, both previously used for example in an unsecured data network, can therefore continue to be used unchanged when the method according to the invention is applied. The secured transmission of data can thus be realized with modest technical expenditure.

It is particularly advantageous
if the User Datagram Protocol is provided as the transmission protocol used for the unsecured transmission of data,
if the Transmission Control Protocol is provided as the transmission protocol used for the secured transmission of data,
if the data which, when transmitted, is present in a format corresponding to the User Datagram Protocol is converted to a format corresponding to the Transmission Control Protocol,
if the data is conveyed according to the Transmission Control Protocol, and
if the data is converted back, prior to reception; to a format corresponding to the User Datagram Protocol.

This variant of the invention employs means that are tried-and-tested and standardized. The novel method can therefore be introduced in a particularly simple manner.

This is because the Transmission Control Protocol was originally developed for transmitting data between Unix data processing systems. A widely used protocol combination arose there in conjunction with the Internet-Protocol, or IP for short. The two together also form the protocol basis of the internet.

TCP is a connection-oriented transport protocol enabling a logical full duplex point-to-point connection. It ensures that data is transmitted error-free and in the required sequence. Any faulty or lost data is re-requested from the sender.

Connections are set up and cleared down using three-way handshaking during which protocol information for setting up and clearing down the logical connection is exchanged between the sender and recipient. Errors are detected and, within limits, corrected.

It is also favorable if conversion from the unsecured to the secured transmission of data and vice versa takes place in a traffic reliabler device.

Use of the traffic reliabler device forms the basis for carrying out data conversion independently of the control unit and specimen. The remote arrangement allows the protocol-conversion mechanism to be introduced or, as the case may be, subsequently modified in a particularly simple manner.

A further favorable embodiment of the invention is provided by a method wherein data which is present in the User Datagram Protocol is packed into a data packet according to the Transmission Control Protocol.

The data is here transferred unchanged from the User Datagram Protocol to a packet using the Transmission Control Protocol, meaning that the data is subsequently transmitted in tunneled mode.

The object of the invention is furthermore achieved by means of an arrangement
wherein arranged between the control unit and specimen are two modules for converting the data from a format corresponding to the transmission protocol used for the unsecured transmission of data to a format corresponding to a transmission protocol used for the secured transmission of data, and vice versa, and wherein arranged between said two modules is a data transmission line for transmitting data according to the transmission protocol used for the secured transmission of data.

The arrangement according to the invention ensures the secured transmission of data at least link by link. Moreover, there is no need for separate securing on the part of the control unit or specimen. The control unit and specimen, both previously used for example in an unsecured data network, can therefore continue to be used unchanged when the method according to the invention is applied. It is further noted that the advantages cited in connection with the various variants of the method according to the invention apply equally to the various embodiments of the arrangement according to the invention.

It is also favorable if traffic reliabler devices are provided as modules, if two traffic reliabler devices are arranged between the control unit and specimen, and if a data transmission line for transmitting data according to the TCP is arranged between said two traffic reliabler devices.

A secured transmission of data is here achieved through the use of standardized means. TCP is a widely used and acknowledged protocol for the secured transmission of data.

It is furthermore advantageous if one traffic reliabler device is arranged directly at the site of the control unit and one such device is arranged directly at the site of the specimen.

Maximum transmission quality can be achieved by arranging the traffic reliabler device in as close proximity as possible to, respectively, the control unit and specimen. The traffic reliabler device can, however, also conceivably be integrated in the control unit and/or specimen.

BRIEF DESCRIPTION OF THE DRAWING

The sole FIGURE shows a control unit STR, a specimen PRÜ, and a first and a second traffic reliabler device TRD1 and TRD2 respectively, with the control unit STR being connected to the first traffic reliabler device TRD1, this being connected to the second traffic reliabler device TRD2, and this being connected to the specimen PRÜ.

DETAILED DESCRIPTION OF THE INVENTION

Figure 1:
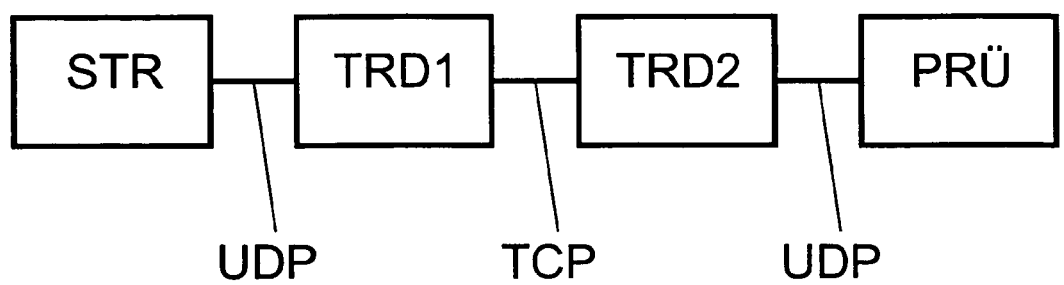

The invention is explained below in more detail with the aid of an exemplary embodiment relating to the link-by-link transmission of data between the control unit and specimen according to the Transmission Control Protocol.

FIG. 1 shows a control unit STR, a specimen PRÜ, and a first and a second traffic reliabler device TRD1 and TRD2 respectively, with the control unit STR being connected to the first traffic reliabler device TRD1, this being connected to the second traffic reliabler device TRD2, and this being connected to the specimen PRÜ. Further indicated is the transmission protocol according to which data is transmitted between the individual modules, which is to say using the User Datagram Protocol UDP between the control unit STR and the first traffic reliabler device TRD1, using the Transmission Control Protocol TCP between the first traffic reliabler device TRD1 and the second traffic reliabler device TRD2, and again using the User Datagram Protocol UDP between the second traffic reliabler device TRD2 and specimen PRÜ.

The arrangement shown in FIG. 1 operates as follows:

Data, which is to say control instructions, for instance, which is sent from the control unit STR to the specimen PRÜ is transmitted as far as the first traffic reliabler device TRD1 using the User Datagram Protocol UDP. Said data is there packed into corresponding packets in keeping with the Transmission Control Protocol TCP and sent to the second traffic reliabler device TRD2. Transmission therefore takes place on this section in a secured manner.

The packets are unpacked at the second traffic reliabler device TRD2 and conveyed to the specimen PRÜ using the User Datagram Protocol UDP. The control instruction, whose function in the example shown is to initiate a measurement, is evaluated in the specimen PRÜ. The relevant measurement is therefore subsequently carried out and the measurement result sent back to the control unit.

The data is hereby transmitted as far as the second traffic reliabler device TRD2 using the User Datagram Protocol UDP, packed there into corresponding packets in keeping with the Transmission Control Protocol TCP, sent on to the first traffic reliabler device TRD1, converted in the first traffic reliabler device TRD1 to the User Datagram Protocol UDP, then conveyed to the control unit STR in keeping with that protocol and displayed there.

In this way it is ensured that the data is transmitted unchanged on the section between the first traffic reliabler device TRD1 and the second traffic reliabler device TRD2 and that, for example, the measurement results will not be corrupted. Maximum transmission quality can be achieved by arranging the first traffic reliabler device TRD1 in as close proximity as possible to the control unit STR or, as the case may be, integrating said device TRD1 in the control unit STR, and by arranging the second traffic reliabler device TRD2 in as close proximity as possible to the specimen PRÜ or, as the case may be, integrating said device TRD2 in the specimen PRÜ.

The invention claimed is:

1. A method for remote-controlled testing of a device, comprising:

providing data at a control unit, the data in a first format that corresponds to a transmission protocol used for an unsecured transmission of the data, the data having a command for testing the device to be tested;

transmitting the data toward the device to be tested and according to the unsecured transmission protocol;

converting the data from the first format into a second format, the second format corresponding to a transmission protocol used for a secured transmission of data;

transmitting the converted data in the second format toward the device to be tested and according to the secured transmission protocol;

converting the converted data in the second format back to the format corresponding to the first transmission protocol;

transmitting the converted data in the first format toward the device to be tested and according to the unsecured transmission protocol;

receiving the converted data in the first format by the device to be tested;

performing a test at the device to be tested by using the command in the received data;

providing a response data by the device to be tested, the response data having a result from the performed test and in the first format transmitting the response data toward the control unit and according to the unsecured transmission protocol;

converting the response data from the first format into the second format;

transmitting the converted response data in the second format toward the control unit and according to the secured transmission protocol;

converting the converted response data in the second format back to the format corresponding to the first transmission protocol;

transmitting the converted response data in the first format toward the control unit and according to the unsecured transmission protocol;

receiving the converted response data in the first format by the control unit, whereby the device to be tested is remotely tested.

2. The method according to claim 1, wherein the User Datagram Protocol is provided as the transmission protocol used for the unsecured transmission of data, and wherein the Transmission Control Protocol is provided as the transmission protocol used for the secured transmission of data.

3. The method according to claim 1, wherein conversion from the unsecured to the secured transmission of data and vice versa takes place in a traffic reliabler device.

4. The method according to claim 2, wherein conversion from the unsecured to the secured transmission of data and vice versa takes place in a traffic reliabler device.

5. The method according to claim 2, wherein data which is present in the User Datagram Protocol is packed into a data packet according to the Transmission Control Protocol.

6. The method according to claim 3, wherein data which is present in the User Datagram Protocol is packed into a data packet according to the Transmission Control Protocol.

7. The method according to claim 4, wherein data which is present in the User Datagram Protocol is packed into a data packet according to the Transmission Control Protocol.

8. An arrangement for performing a method for remote-controlled testing of a device, comprising:

a control unit for sending data to the device to be tested,
the data in a first format that corresponds to a transmission protocol used for an unsecured transmission of the data,
the data having a command for testing the device to be tested;

two modules, arranged between the control unit and the device to be tested, for converting the data from a format corresponding to the transmission protocol used for the unsecured transmission of data to a format corresponding to a transmission protocol used for the secured transmission of data, and vice versa; and a data transmission line for transmitting data according to the transmission protocol used for the secured transmission of data, wherein the data transmission line is arranged between two modules, wherein transmission via the control unit and from the device to be tested is in the unsecured format, wherein the data is transmitted toward the device to be tested and according to the unsecured transmission protocol, wherein the data is converted from the first format into a second format, the second format corresponding to a transmission protocol used for a secured transmission of data, wherein the converted data is transmitted in the second format toward the device to be tested and according to the secured transmission protocol, wherein the converted data is convened in the second format back to the format corresponding to the first transmission protocol, wherein the converted data is transmitted in the first format toward the device to be tested and according to the unsecured transmission protocol, wherein the converted data is received in the first format by the device to be tested, wherein a test is performed at the device to be tested by using the command in the received data, wherein a response data is provided by the device to be tested, the response data having a result from the performed test and in the first format, wherein the response data is transmitted toward the control unit and according to the unsecured transmission protocol, wherein the response data is converted from the first format into the second format, wherein the converted response data is transmitted in the second format toward the control unit and according to the secured transmission protocol, wherein the converted response data is converted in the second format back to the format corresponding to the first transmission protocol;

wherein the converted response data is transmitted in the first format toward the control unit and according to the unsecured transmission protocol, wherein the converted response data in the first format is received by the control unit, whereby the device to be tested is remotely tested.

9. The arrangement according to claim 8, wherein the modules are traffic reliabler devices, wherein two traffic reliabler devices are arranged between the control unit and the device to be tested, and wherein a data transmission line for transmitting data according to the Transmisson Control Protocol is arranged between the two traffic reliabler devices.

10. The arrangement according to claim 9, wherein a traffic reliabler device is arranged directly at the site of the control unit and a further traffic reliabler device is arranged directly at the site of the device to be tested.

* * * * *